(12) United States Patent
Arenburg et al.

(10) Patent No.: US 6,191,800 B1
(45) Date of Patent: Feb. 20, 2001

(54) DYNAMIC BALANCING OF GRAPHICS WORKLOADS USING A TILING STRATEGY

(75) Inventors: Robert Thomas Arenburg, Round Rock; Andrew Kent Taylor, Austin, both of TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/132,856

(22) Filed: Aug. 11, 1998

(51) Int. Cl.[7] .................................................. G06F 15/80
(52) U.S. Cl. .......................................... 345/505; 345/509
(58) Field of Search .................................. 345/501–505, 345/507, 509

(56) References Cited

U.S. PATENT DOCUMENTS

| | | | |
|---|---|---|---|
| 5,757,385 | * 5/1998 | Narayanaswami et al. | 345/505 |
| 5,798,770 | * 8/1998 | Baldwin | 345/506 |
| 5,818,469 | * 10/1998 | Lawless et al. | 345/522 |
| 5,852,443 | * 12/1998 | Kenworthy | 345/431 |
| 6,046,752 | * 4/2000 | Kirkland et al. | 345/505 |
| 6,052,125 | * 4/2000 | Gardiner et al. | 345/421 |

OTHER PUBLICATIONS

T. Nguyen, & J. Zahorjan, "Scheduling Policies to Support Distributed 3D Multimedia Applications", Joint Intl Conf on Measurement & Modeling of Computer Sys, 1998, pp. 244–253.*

A. Rockwood, K. Heaton, T. Davis, "Real–Time Rendering of Trimmed Surfaces", Computer Graphics, vol. 23, No. 3, Jul. 1989, pp. 107–116.*

R. Samanta et al., "Load Balancing for Multi–Project Rendering Systems", Proceedings 1999 Eurographics/SIGGRAPH Workshop on Graphics Hardware, 1999, pp. 107–116.*

S. Whitman, "A Task Adaptive Parallel Graphics Renderer", Proceedings of the 1993 Symposium on Parallel Rendering, 1993, pp. 27–34.*

* cited by examiner

*Primary Examiner*—Ulka J. Chauhan
(74) *Attorney, Agent, or Firm*—Volel Emile; Felsman, Bradley, Vaden, Gunter & Dillon, LLP (57) ABSTRACT

A method of generating graphic images on a display device of a computer system, by dividing the viewable area of the display device into a plurality of tiles, assigning each of the tiles to respective rendering processes, rendering a frame on the display device using the rendering processes, and adjusting the sizes of the tiles in response to the rendering step. The method then uses the adjusted tile sizes to render the next frame. The tile areas are preferably constrained from becoming too small. The adjusted tile sizes may optionally be smoothed, such as by averaging in weighted sizes from previous frames. The tile sizes are adjusted by measuring the rendering times required for each rendering process to complete a respective portion of the frame, and then resizing the tiles based on the measured rendering times.

10 Claims, 6 Drawing Sheets

DYNAMIC BALANCING OF GRAPHICS WORKLOADS USING A TILING STRATEGY

BACKGROUND OF THE INVENTION

1. Field of the Invention

The present invention generally relates to computer systems, and more particularly to the generation of computer graphics employing an improved method of balancing graphics workloads using multiple concurrent rendering processes to refresh the computer display, the method utilizing a novel tiling strategy.

2. Description of Related Art

Figure 1:
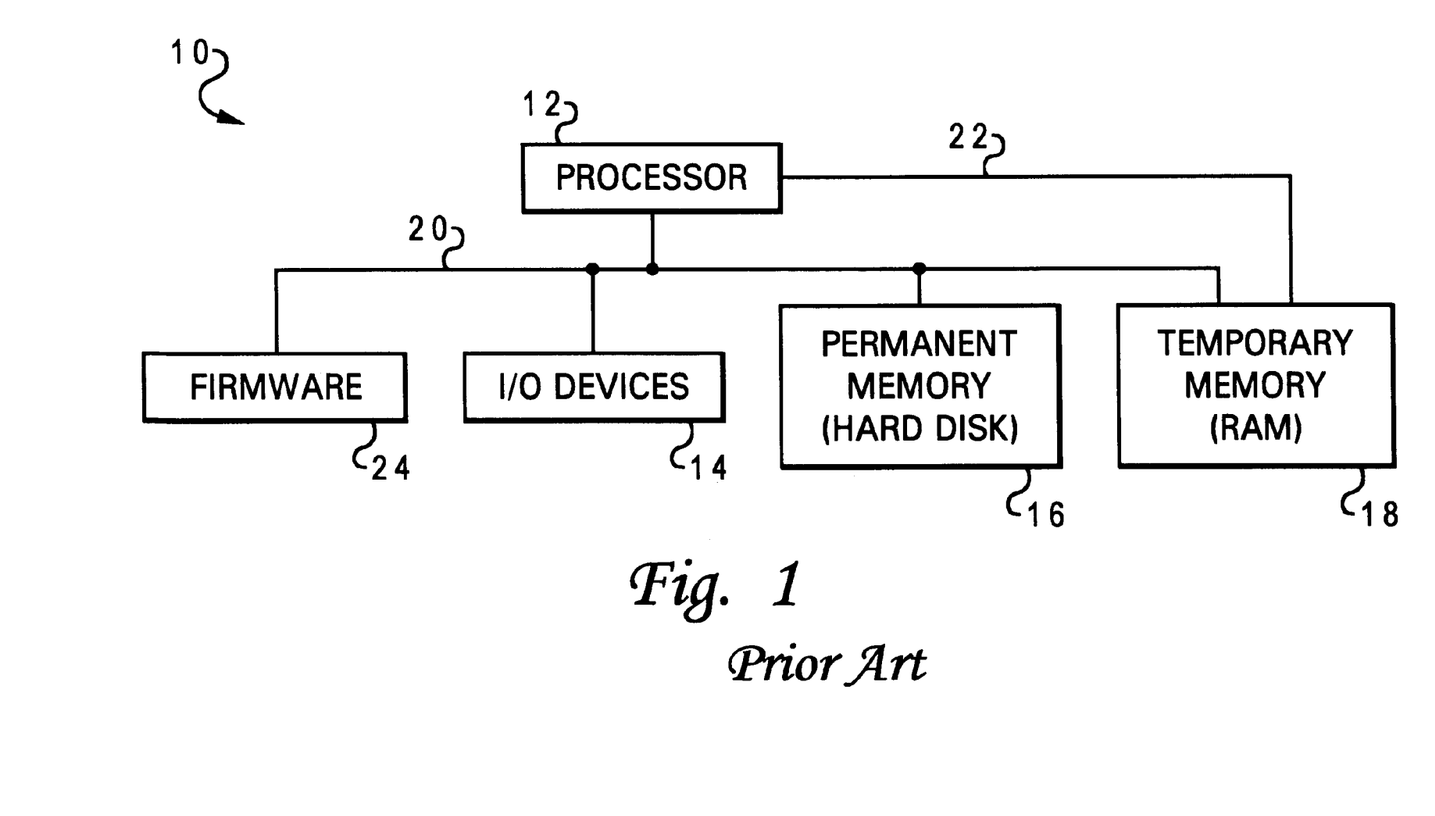
FIG. 1 is a block diagram of a conventional computer system.

The basic structure of a conventional computer system 10 is shown in FIG. 1. Computer system 10 has at least one central processing unit (CPU) or processor 12 which is connected to several peripheral devices, including input/output devices 14 (such as a display monitor, keyboard, and graphical pointing device) for the user interface, a permanent memory device 16 (such as a hard disk) for storing the computer's operating system and user programs, and a temporary memory device 18 (such as random access memory or RAM) that is used by processor 12 to carry out program instructions. Processor 12 communicates with the peripheral devices by various means, including a bus 20 or a direct channel 22. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter connected to processor 12 might be used to control a video display monitor, and a memory controller may be used as an interface between temporary memory device 18 and processor 12. Computer system 10 also includes firmware 24 whose primary purpose is to seek out and load an operating system from one of the peripherals (usually permanent memory device 16) whenever the computer is first turned on.

Figure 2:
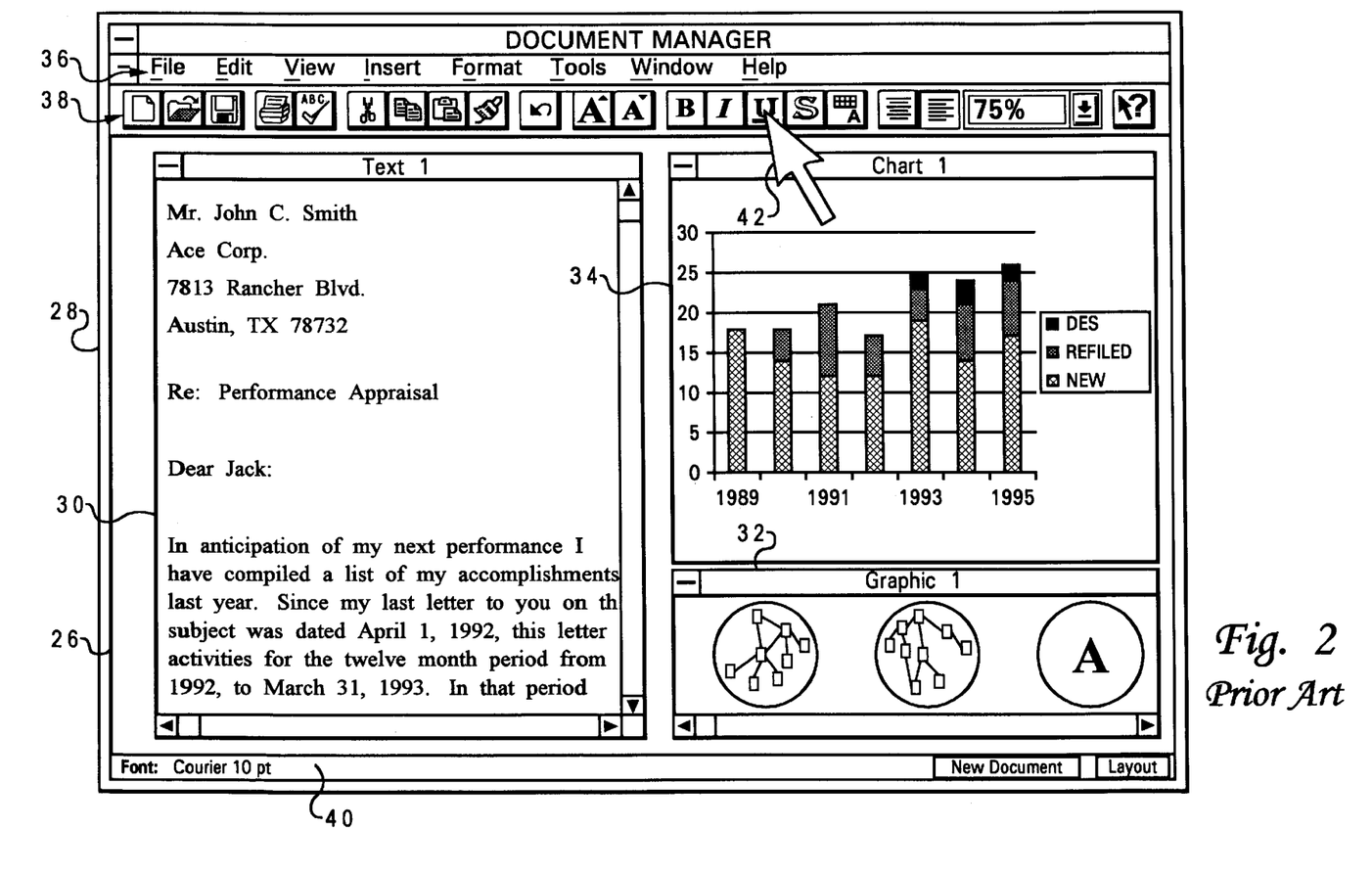
FIG. 2 is an illustration of a computer display showing a conventional graphical user interface (GUI) having various windows for viewing different multimedia content, such as text, graphics, and video animation.

With further reference to FIG. 2, conventional computer systems often employ a graphical user interface (GUI) to present information in a graphical form to the user. In the example of FIG. 2, a generic application program entitled "Document Manager" is presented by the GUI as a primary application window (parent window) 26 on a display device 28 (i.e., video monitor). In this example, the application window has several secondary, enclosed windows (child windows) 30, 32 and 34 which depict the contents of various files that are handled by the program. The file depicted in window 32 is a video animation (moving images). A menu bar 36 with a standard set of commands, a toolbar 38, and a status bar 40 may be provided as part of the GUI, to simplify manipulation and control of the objects (e.g., text, charts and graphics) within the child windows, using a graphical pointer 42 which is controlled by a pointing device (mouse).

As computer systems have become more powerful, applications have been developed which present much more graphic-intensive data, including video animation. The presentation of such multimedia information can often strain the abilities of the computer system, since it may take a significant amount of time for the operating system and hardware to repaint (refresh) the display screen each time a change is to occur in the video output. The present invention is directed to a method of handling graphics workloads which are used by the computer system to repaint the screen.

One strategy for speeding up the generation of computer graphics consists of utilizing multiple concurrent rendering processes to perform animation. A computer program (including an operating system which is responsible for displaying a GUI) can be broken down into a collection of processes which are executed by the processor(s). The smallest unit of operation to be performed within a process is referred to as a thread. The use of threads in modern operating systems is well known. Threads allow multiple execution paths within a single address space (the process context) to run concurrently on a processor. This "multi-threading" increases throughput in a multi-processor system, and provides modularity in a uni-processor system.

In this context, a "rendering process" refers to either a thread of an application or a distinct application. Additionally, "concurrent rendering processes" refers to two or more threads of an application, two or more applications on the same system, two or more applications on different systems, or a combination of these, all rendering portions of an image (concurrent rendering processes can be distributed among several processes in a cluster). Thus, by dividing up the task of rendering an image between multiple rendering processes, substantial performance gains may be obtained. The difficultly lies in dividing up the workload to be performed in an efficient manner.

One possible way in which the work may be distributed among the available rendering processes is to subdivide the display into multiple rectangular regions, or tiles, and then assign one or more tiles to a process. While this simple technique does distribute the work to the available processes, it may not be optimal in the sense that each process may or may not perform an equal share of the work. Consider the simple problem in which a window is divided vertically into right and left sides (only two tiles). If an object (image) is rendered in the center of the window, then the workload will be approximately equal between the two tiles, but if the object is located in the right tile then the process associated with this tile will do all the work leaving the process associated with the left tile with very little work to perform.

A common approach to solving this workload distribution problem is to simply subdivide the window into a large number of fixed size tiles, and then assign to each rendering process a set of several tiles which are distributed over the entire window. The set of tiles is determined in a static manner (i.e., according to a predetermined function). The expectation with this approach is that, no matter where an object is placed, the rendering workload will be distributed relatively equally among the rendering processes. Certainly, as the number of tiles increases, the workload will become more evenly distributed with this approach. Thus, while this strategy can be effective, it can also lead to a great deal of complexity in designing a graphics subsystem in which a single process can efficiently render multiple tiles, due to the additional burden of managing multiple tiles. This overhead burden can adversely affect graphics generation, wiping out any performance gains that might otherwise be achieved using tiling.

None of the prior art techniques for handling graphics workloads address the fundamental problem of how to optimally distribute the rendering workload among several processes. It would, therefore, be desirable to devise an improved method of balancing graphics workloads when a graphics animation sequence is rendered by multiple processes, which addresses this problem. It would be further advantageous if the method were easily scalable to any number of processes.

SUMMARY OF THE INVENTION

It is therefore one object of the present invention to provide improved generation of computer graphics for a computer system, wherein the system manages graphics workloads using multiple concurrent rendering processes.

It is another object of the present invention to provide such a method of generating computer graphics which dynamically balances graphics workloads using a tiling strategy.

It is yet another object of the present invention to provide such a method which more evenly distributes work to be performed among the tiles and, hence, among the processes, in order to speed up graphics generation.

The foregoing objects are achieved in a method of generating graphic images on a display device of a computer system, generally comprising the steps of dividing the viewable area of the display device into a plurality of tiles, assigning each of the tiles to a respective one of a plurality of rendering processes, rendering a frame on the display device using the respective rendering processes, and adjusting the sizes of at least two of the tiles in response to the rendering step. The method then uses the adjusted tile sizes to render the next frame with the respective rendering processes. In certain situations, it may be desirable to constrain the tile areas from becoming too small, in which case they are assigned a predetermined minimum value. The adjusted tile sizes may optionally be smoothed, such as by averaging in weighted sizes from previous frames. The tile sizes are adjusted by measuring the rendering times required for each rendering process to complete a respective portion of the frame, and then resizing the tiles based on the measured rendering times.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

The present invention is directed to a data processing system which speeds up generation of graphic images by utilizing multiple concurrent rendering processes to refresh a video display. The invention is particularly advantageous when performing animation on a computer display. The computer system's hardware may include the various components shown in FIG. 1, but the computer system is not necessarily conventional, i.e., it could include new hardware components as well, or have a novel interconnection architecture for existing components. Therefore, while the present invention may be understood with reference to FIG. 1, this reference should not be construed in a limiting sense. The method of the present invention may further be adapted for use with existing operating systems such as OS/2 (a trademark of International Business Machines Corp.) or Windows 98 (a trademark of Microsoft Corp.).

Figure 3A:
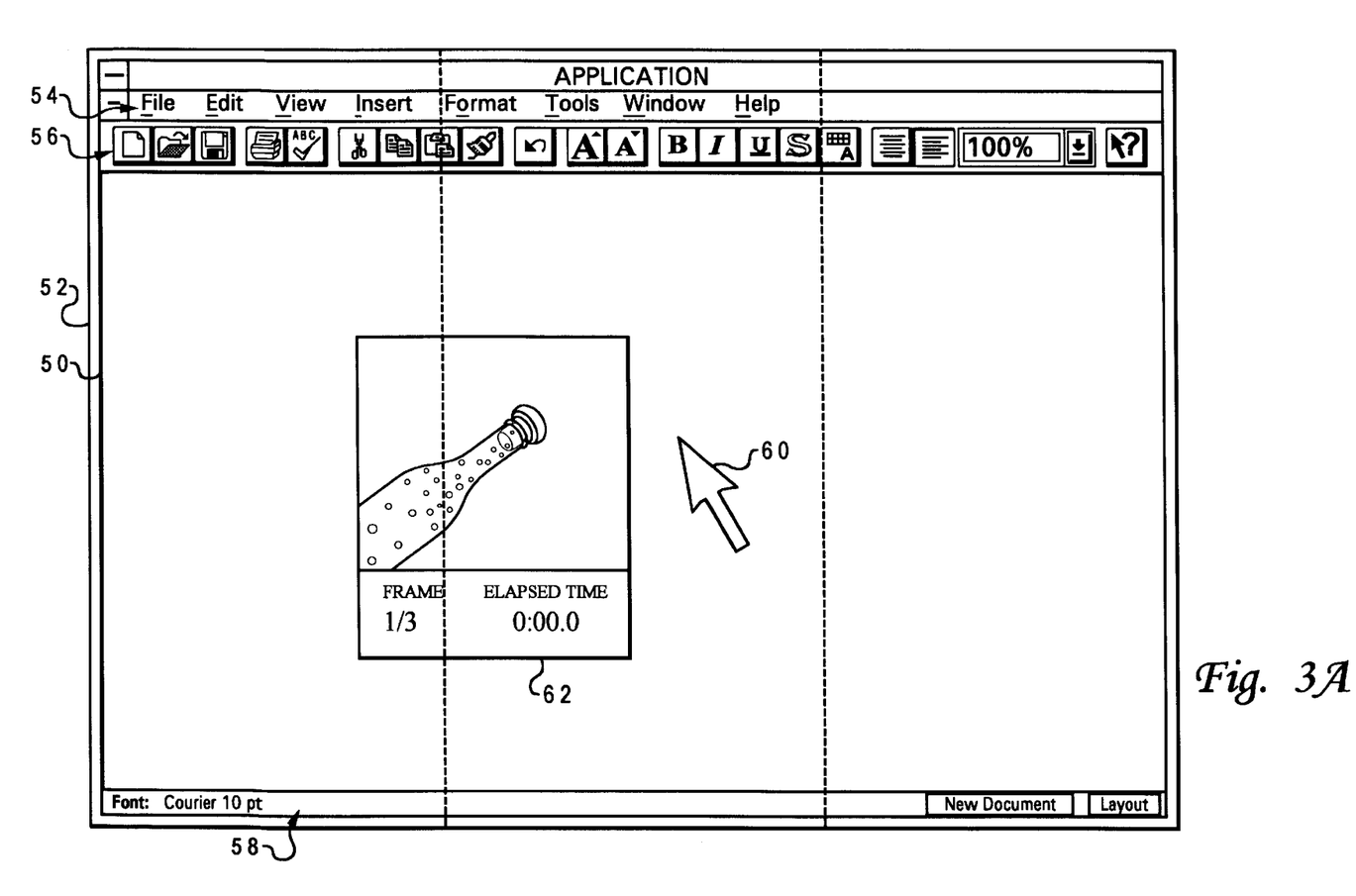
FIGS. 3A–3C are illustrations of a computer display showing how the viewable area of the display is divided into three vertical tiles to generate graphic images, and how the tiles are dynamically resized, in accordance with a simplified implementation of the present invention.
Figure 3B:
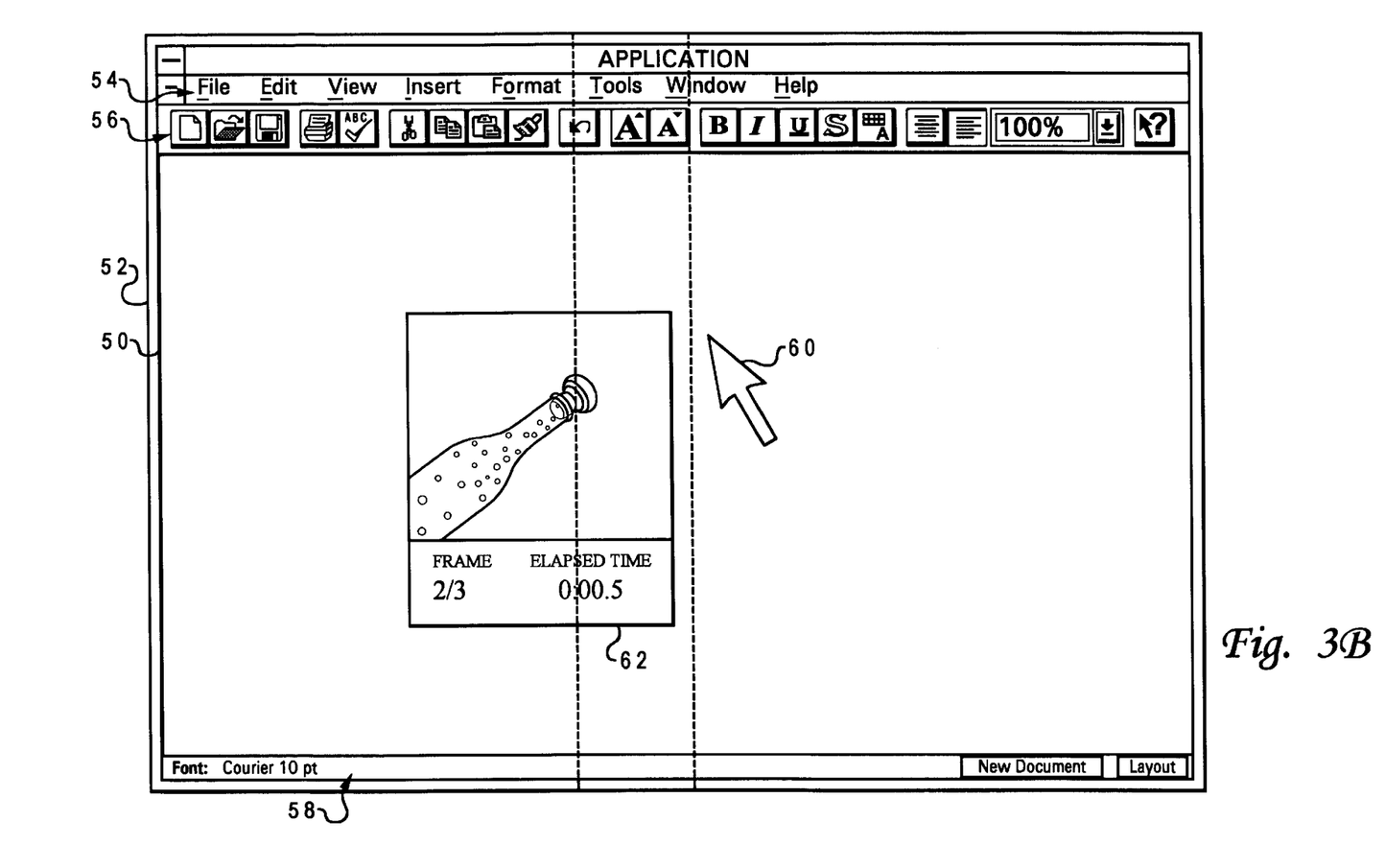
Figure 3C:
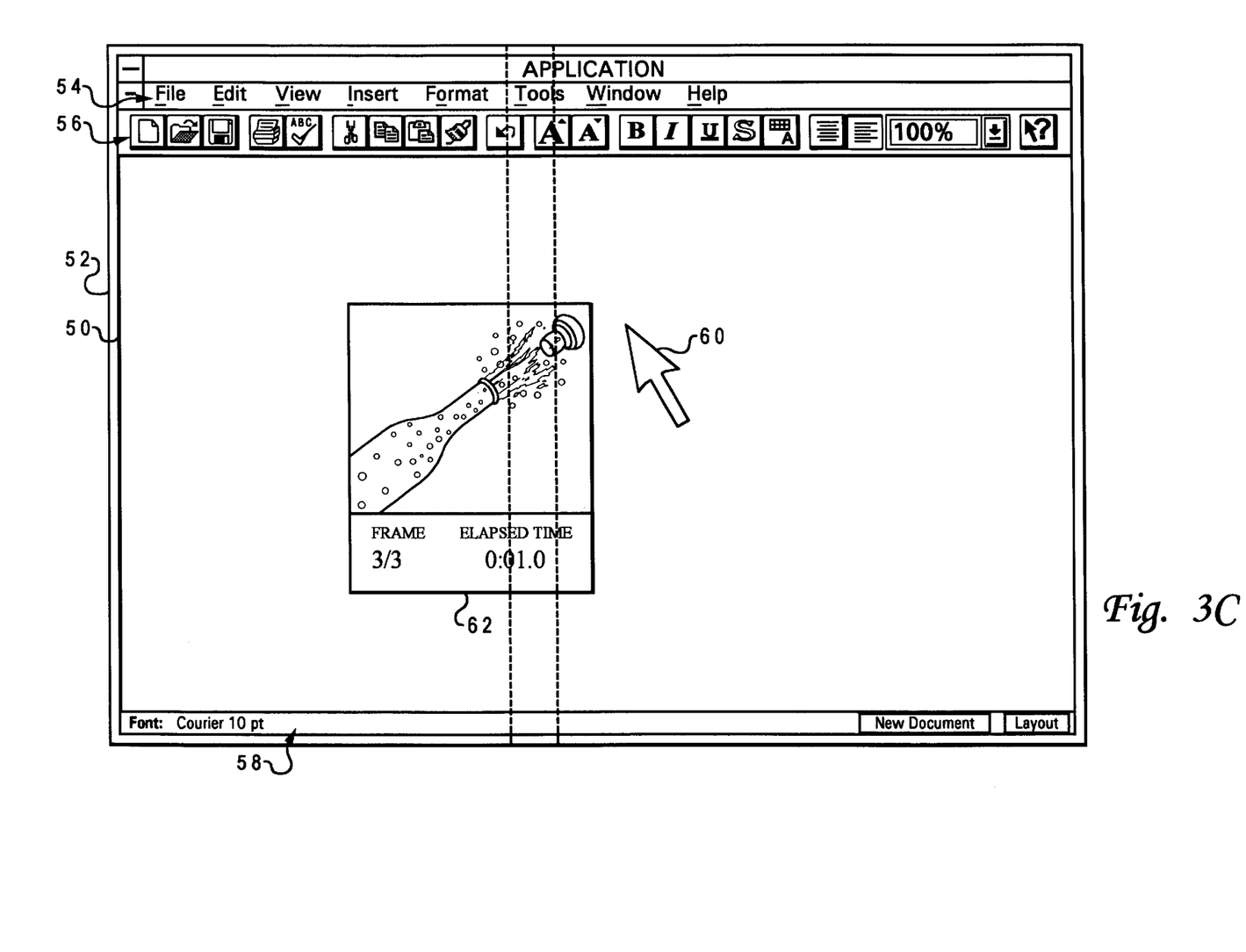

With reference now to FIGS. 3A–3C, the present invention introduces the concept of dynamically balancing graphics workloads among the available rendering processes, by subdividing the window or display into multiple rectangular regions or tiles, assigning a single tile to each rendering process, and then distributing the workload by adjusting the tile size so that each process gets approximately equal amounts of work to perform. As will become apparent to those skilled in the art, this technique is particularly advantageous for use in an application performing some type of animation sequence which requires high frame rates. The illustrative embodiment assumes some degree of communication/collaboration between the rendering processes.

FIG. 3A depicts a graphical user interface (GUI) 50 which is generated using the novel tiling strategy of the present invention. GUI 50 is presented on a display device 52 of the computer system, and may include standard features such as the menu bar 54, toolbar 56, status bar 58, and graphical pointer 60. For the initial frame, a preselected number of tiles are evenly arranged to construct the GUI. In the depicted example, three vertical tiles of generally equal size are shown by the dashed lines forming a grid in FIG. 3A. Each of the tiles is assigned to a respective rendering process. FIG. 3A also depicts a champagne bottle which is being opened (uncorked) in a video animation window 62. In this initial frame, the bottle is shown fully corked.

In the second frame, shown in FIG. 3B, the cork of the champagne bottle has been moved to the lip of the bottle. The sizes of the tiles have also been adjusted dynamically based on the amount of work that was performed in advancing to the second frame. Since the primary movement was the cork, the tile to the left of the cork has enlarged to include a portion of the cork, so as to divide up the job of rendering the cork motion between two tiles (the left and center tiles). The tile to the right of graphical pointer 60 (which was also moved slightly by the user) has also been enlarged to include the graphical pointer. This adjustment of the tile sizes begins to balance out the workloads between the processes handling the respective tiles.

In the third frame, shown in FIG. 3C, the cork of the champagne bottle has exited the bottle and champagne is splashing out. The sizes of the tiles have again been adjusted, with the center tile shrinking even smaller to include the central portion of the splashing champagne, and the changing number in the elapsed time field. By further adjusting the size of the tiles around the animated portions of the video display, the overall workload is dynamically redistributed in a more even fashion.

FIGS. 3A–3C conceptually illustrate an overly simplified, specific example of how the present invention may be implemented. More generally, the technique may be applied to any number of tiles with more complicated restructuring of the tile sizes (and not necessarily limited to vertical tiles). The method is accomplished by having each process update its tile geometry/size and measure the time required to render its portion of the image. Based on the current tile configurations and rendering times, new tile sizes are calculated. Optionally, the new tile configurations may be smoothed using a weighted average technique to minimize oscillations in the solution, as explained further below. Finally, the procedure is repeated as each process again updates its tile geometry/size, and measures the latest time required to render its portion of the new image.

The innovative feature of the proposed solution focuses on continuously updating the tile geometries so that the work is distributed equally among the processes and maximum scalability is achieved as additional processes are added. This requires solving the following problem. Consider a window of total area A. The window is subdivided into a series of non-overlapping tiles a(1), a(2), a(3), . . . , a(N), where N is some integer greater than 1. It is assumed for this implementation that each rendering process is assigned to only one tile. The following expression for the total window area A is then obtained in terms of the individual tiles:

$$A=a(1)+a(2)+a(3)+\ldots+a(N) \qquad \text{(Eq. 1)}.$$

If the time required to render a given tile a(i) is t(i), then the optimal rendering would require:

$$t(1)=t(2)=t(3)=\ldots=t(N) \qquad \text{(Eq. 2)}.$$

This condition describes the situation in which all of the rendering process are each performing an equal amount of work. To solve these equations a relationship is needed between the rendering times and the tile areas. This relationship is developed by utilizing the information from the last rendered frame in the animation sequence, as follows:

$$t(i)=c(i)*a(i) \text{ for } i=1, 2, 3, \ldots, N \qquad \text{(Eq. 3)}$$

where $$c(i)=t\_\text{last}(i)/a\_\text{last}(i).$$

In the above expression, a_last(i) and t_last(i) are the tile area and the rendering time respectively for the i-th tile from the last rendered frame.

Equation 2 really contains N−1 independent equations. Consider the first of these which states t(1)=t(2). By substituting Eq. 3 into this equation, the following is obtained:

$$a(2)=[c(1)/c(2)]*a(1) \qquad \text{(Eq. 4a)}.$$

Considering now the next equation from Eq. 2, t(2)=t(3) and again substituting in Eq. 3 into this yields:

$$a(3)=[c(2)/c(3)]*a(2) \qquad \text{(Eq. 4b)}.$$

If Eq. 4a is then used to eliminate a(2) from Eq. 4b, the following expression is obtained:

$$a(3)=[c(1)/c(3)]*a(1) \qquad \text{(Eq. 4c)}.$$

This process can be repeated for the remaining equations in expression Eq. 2 to produce the following general statement:

$$a(i)=C(i)*a(1) \text{ for } i=2, 3, 4, \ldots, N \qquad \text{(Eq. 5a)}$$

where $$C(i)=c(1)/c(i) \text{ for } i=2, 3, 4, \ldots, N.$$

By substituting Eq. 5a into Eq. 1 the solution for a(1) is obtained as:

$$a(1)=A/[1+C(2)+C(3)+C(4)+\ldots+C(N)] \qquad \text{(Eq. 5b)}.$$

Thus, the general solution for the optimal tile sizes is obtained by first solving Eq. 5b for a(1), and then iterating through the series of expressions presented in Eq. 5a for the remaining tile areas.

To begin the sequence, initial conditions for Eq. 3 are needed. A simple strategy is to assign all the tile sizes to the same value, i.e., a_last(i)=A/N, and to set the times to some common value, t_last(i)=1.

The solution presented in Eq. 4 has proven to be simple to calculate, robust and well-behaved. However, in certain extreme situations it may be desirable to constrain the tile areas from becoming too small, or simply stated:

$$a(i)>A\_\text{Minimum for } i=1, 2, 3, \ldots, N \qquad \text{(Eq. 6)}.$$

These constraints may be incorporated in the solution of Eqs. 1–3 directly which may require resorting to a numerical solution technique. Alternatively, an approximate solution may be employed by first using Eq. 5 to obtain the initial unconstrained solution. If a tile is found with an area less than A_Minimum, then this tile area is set to A_Minimum, and in turn all the other tile areas are proportionately reduced so that Eq. 1 still applies. This procedure may have to be repeated numerous times as needed for any additional tiles which satisfy Eq. 6.

After new tile sizes are calculated, they may be subjected to an optional smoothing operation. Since Eq. 3 is only a simple linear approximation of the behavior of the system, the solution obtained in Eq. 5 is approximate, and experience indicates that this solution oscillates around the true solution. To damp out these oscillations, the solutions from several previous steps may be averaged together using a simple weighted averaging technique. Consider the i-th tile at the j-th animation frame:

$$a\_\text{avg}=[w(0)*a(j)]+[w(1)*a(j-1)]+[w(2)*a(j-2)]+\ldots+[w(M)*a(j-M)] \qquad \text{(Eq. 7)}$$

where a_avg is the averaged tile area, M is the number of previous frames used in the averaging, a(j) is the current solution for the i-th tile from Eq. 5, a(j−1) is the i-th tile for at the j−1 animation frame, a(j−2) is the i-th tile for at the j−2 animation frame, and so on for the remaining animation frames. In Eq. 7, each w(i) is a weighing factor. These factors are simply constants which must sum to 1, in other words:

$$w(0)+w(1)+w(2)+\ldots+w(M)=1 \qquad \text{(Eq. 8)}.$$

Since Eq. 7 is for a typical tile, this expression is applied to all N tiles which compose the window to be repainted.

The weighted average described in Eq. 7 is very general. Consider the case where M=1. By letting w(0)=W and w(1)=1−W, then Eq. 7 becomes:

$$a\_\text{avg}=W*a(j)+[(1-W)*a(j-1)] \qquad \text{(Eq. 9)}$$

Very good damping of the oscillations have been achieved by using values of W in the range of 0.3 to 0.1.

Figure 4:
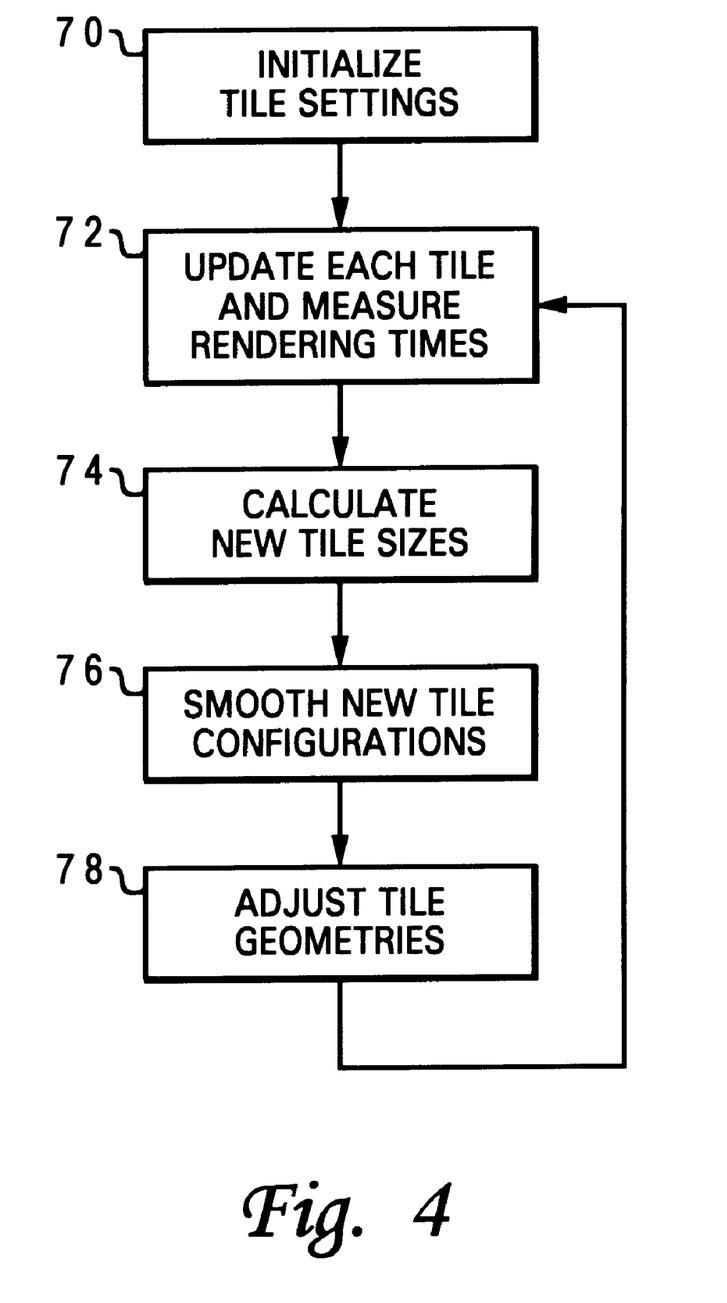
FIG. 4 is a chart depicting logic flow according to the method of the present invention for dynamically balancing graphics workloads using the tiling strategy illustrated in FIGS. 3A–3C.

FIG. 4 is a flow chart which summarizes the basic logic carried out the by present invention. The first step is to initialize the tile settings (70). Suitable values for N (the total number of tiles) preferably range from 2 to 10. Each tile is updated one frame, and the various times that it takes for each tile to be rendered are measured (72). New tile sizes are then calculated, using Eqs. 5b and 5a, constrained by Eq. 6 (74). The new tile configurations are smoothed using the weighting of Eq. 7 (76). Once the final tile area values a(i) are known, the relative geometries are determined using standard topological techniques (78). The logic flow then returns to step 72 for repeated iterations.

The technique described herein provides a novel load balancing technique for use when a graphics animation sequence is rendering by multiple processes utilizing a tiling strategy for work division. The unique aspect of the solution methodology consists of continuously monitoring the rendering times of each tile and then adjusting the tile size so the workload is distributed among the tiles into approximately equal amounts. A set of algebraic equations are described which distribute the workload in a near optimal fashion. These equations yield a simple closed form solution, as shown in Eq. 5. Performance measurements indicate rendering speed-ups of approximately 20% over a similar statically tiled solution are possible. The invention is particularly useful in rendering three-dimensional (3-D) graphic animation and when used in a multi-processor system where concurrent rendering processes can be distributed among several processes in a cluster.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention is not limited to personal computers, as it is also applicable to other computer systems such as limited purpose video games. It is therefore contemplated that such modifications can be made without departing from the spirit or scope of the present invention as defined in the appended claims.

What is claimed is:

1. A method of generating graphic images on a display device of a computer system, comprising the steps of:

dividing the viewable area of the display device into a plurality of tiles;

assigning each of the tiles to a respective one of a plurality of rendering processes;

rendering a frame on the display device using the respective rendering processes;

adjusting the sizes of at least two of the tiles in response to said rendering step, and smoothing at least two of the adjusted tile sizes, by calculating a smooth tile size a_avg according to the formula:

$$a\_avg=[w(0)*a(j)]+[w(1)*a(j-1)]+[w(2)*a(j-2)]+\ldots+[w(M)*a(j-M)]$$

where a(j) is the size of a tile for the j-th frame rendered, M is an integer less than j, and w(i) is a weighing factor subject to the further formula $$w(0)+w(1)+w(2)+\ldots+w(M)=1.$$

2. The method of claim 1 comprising the further step of rendering a second frame on the display device using the respective rendering processes, after said adjusting step.

3. The method of claim 1 wherein said adjusting step constrains at least one of the adjusted tile sizes to a minimum value.

4. The method of claim 1 wherein the rendering processes are carried out by two or more processors in a processor cluster.

5. A computer system comprising:

a display device;

a pointing device; and processor means for generating graphic images on said display device by (i) dividing the viewable area of the display device into a plurality of tiles, (ii) assigning each of the tiles to a respective one of a plurality of rendering processes, (iii) rendering a frame on the display device using the respective rendering processes, (iv) adjusting the sizes of at least two of the tiles in response to said rendering step, (v) smoothing at least two of the adjusted tile sizes by calculating a smooth tile size a_vg according to the formula;

$$a\_avg=[w(0)*a(j)]+[w(1)*a(j-1)]+[w(2)*a(j-2)]+\ldots+[w(M)*a(j-M)]$$

where a(j) is the size of a tile for the j-th frame rendered, M is an integer less than j, and w(i) is a weighing factor subject to the further formula $$w(0)+w(1)+w(2)+\ldots+w(M)=1.$$

6. The computer system of claim 5 wherein said processor means generates the graphic images by further rendering a second frame on the display device using the respective rendering processes, after said adjusting of the tile sizes.

7. The computer system of claim 5 wherein said processor means further constrains at least one of the adjusted tile sizes to a minimum value.

8. The computer system of claim 5 wherein said processor means includes a processor cluster, and the rendering processes are carried out by at least two processors in the processor cluster.

9. A method of generating graphic images on a display device of a computer system, comprising the steps of:

dividing the viewable area of the display device into a plurality of tiles;

assigning each of the tiles to a respective one of a plurality of rendering processes;

rendering a frame on the display device using the respective rendering processes; and adjusting the sizes of at least two of the tiles in response to said rendering step, wherein said adjusting step includes the step of measuring the rendering times required for each rendering process to complete a respective portion of the frame, and adjusts the tile sizes based on the measured rendering times according to the formulae:

$$a(1)=A/[1+C(2)+C(3)+C(4)+\ldots+C(N)],$$

and $$a(i)=C(i)*a(1) \text{ for } i=2, 3, 4, \ldots, N$$

where a(i) is the size of the i-th tile for the current frame,

N is the number of tiles,

A is the total viewable area of the display device,

C(i)=c(1)/c(i) for i=2, 3, 4, . . . , N, c(i)=t_last(i)/a_last(i), a_last(i) is the tile area for the i-th tile from the last rendered frame, and t_last(i) is the rendering time for the i-th tile from the last rendered frame.

10. A computer system comprising:

a display device;

a pointing device; and processor means for generating graphic images on said display device by (i) dividing the viewable area of the display device into a plurality of tiles, (ii) assigning each of the tiles to a respective one of a plurality of rendering processes, (iii) rendering a frame on the display device using the respective rendering processes, (iv) adjusting the sizes of at least two of the tiles in response to said rendering step, and (v) measuring the rendering times required for each rendering process to complete a respective portion of the frame, wherein said processor means adjusts the tile sizes based on the measured rendering times according to the formulae:

$$a(1)=A/[1+C(2)+C(3)+C(4)+\ldots+C(N)],$$

and $$a(i)=C(i)*a(1) \text{ for } i=2, 3, 4, \ldots, N$$

where a(i) is the size of the i-th tile for the current frame,

N is the number of tiles,

A is the total viewable area of the display device, $C(i)=c(1)/c(i)$ for i=2, 3, 4, . . . , N, $c(i)=t\_last(i)/a\_last(i)$, a_last(i) is the tile area for the i-th tile from the last rendered frame, and t_last(i) is the rendering time for the i-th tile from the last rendered frame.

* * * * *